Patented Dec. 19, 1944

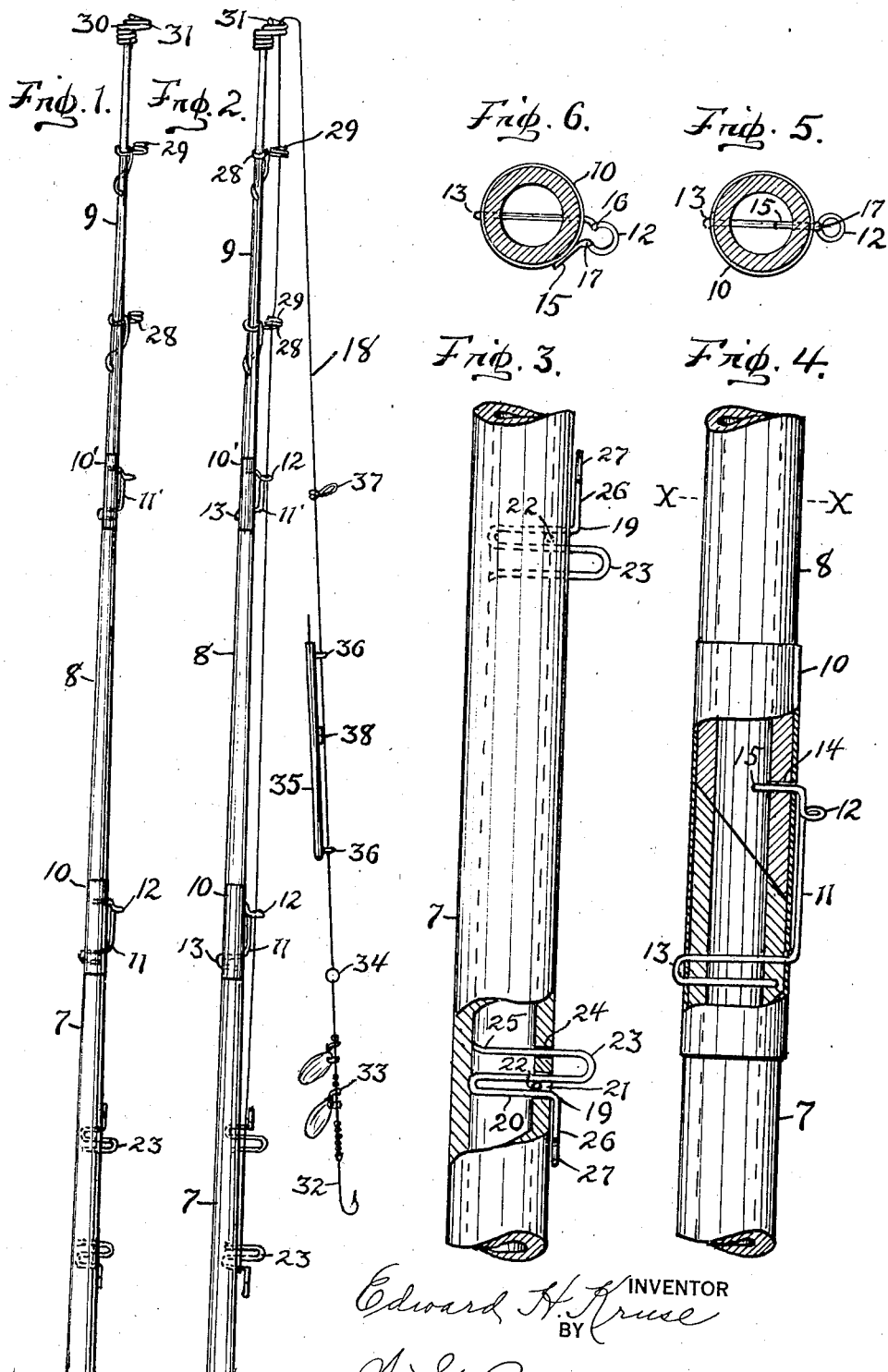

2,365,414

UNITED STATES PATENT OFFICE 2,365,414

FISHING APPARATUS

Edward H. Kruse, Fort Wayne, Ind.

Application August 20, 1942, Serial No. 455,473

2 Claims. (Cl. 43—18)

This invention relates to improvements in fishing apparatus of that type wherein a pole is used in conjunction with a line to which is attached a hook, lures and other equipment.

One of the objects of the invention is to provide a pole, preferably joined, and having cleats around which to wind a fish line, and a series of guides through which the line is strung to have running movement therethrough, and from which the line may be readily disconnected or disassociated from the guides without removal of the hook or other usual paraphernalia that is attached to the free end of the line, thus to enable the fisherman to coil the line around the cleats together with the paraphernalia thereon and permit disjointing of the fish pole without entanglement of the line.

Another object of the invention is to construct the guides that are mounted on the pole so as to permit removal of the line from the guides without necessity of unstringing of the line lengthwise therethrough or removal of the hook and other paraphernalia from the line.

And a further object of the invention is to so form the cleats around which the line is wound that certain portions thereof project outwardly from the pole, thus to afford readily accessible finger grips by which to adjustably manipulate the cleats relative to the pole without interference with the line wound thereon.

Other objects and advantages of the invention appear in the following description.

An illustrative embodiment of the invention is shown in the accompanying drawing, in which—

Fig. 1 is a side elevational view of a fish pole of a jointed type provided with cleats and line guides;

Fig. 2 is a similar view of the pole equipped with a fish line and its accouterments;

Fig. 3 is a fragmentary elevational view of the butt-end of the pole including adjustable cleats in connection therewith, a portion being in section;

Fig. 4 is another fragmentary elevational view of the pole showing its structure where two sections thereof are jointed and the means for securing the sections together, a portion thereof being in section;

Fig. 5 is a cross-sectional end view of Fig. 4 on the line x—x thereof showing the joint securing fastener and the line guide thereof in closed position; and Fig. 6 is a similar cross-sectional view with the fastener and line guide thereof in open position.

The illustrative embodiment of the invention consists of a fish pole, preferably formed of sections 7, 8 and 9 connected together by joints formed of ferrules 10—10' into which the abutting ends of the corresponding sections extend and are secured by means of fasteners 11—11'.

Each of said fasteners is preferably made of spring wire, the medial portion of which overlies the exterior wall of the corresponding ferrule and is provided with a loop to form a line guide 12. One end portion of the fastener is bent and extends through the ferrule and one of the sections 7 of the pole with its terminal doubled back through the ferrule and pole section to form a clinch 13. The opposite end portion of the fastener is bent so as to project through an opening 14 that extends through the ferrule and the adjacent wall of the other pole section 8, and forms a latch 15 to hold the abutting ends of the corresponding sections firmly together within the ferrule when the fastener is in engaging position. Normally, the terminals 16—17 of the loop 12, when the fastener is in engaging position, bear against each other, and when the fastener is sprung outwardly and the latch is moved out of the opening 14 and laid sidewise against the exterior wall of the ferrule, the terminals 16 and 17 of the loop are held spaced apart from each other, whereupon the fish line 18 is readily maneuvered into or out of the guide opening formed by the loop.

The butt end section 7 of the pole has in adjustable connection therewith, oppositely disposed cleats 19 around which to wind and thus take up the line 18. Preferably, each cleat is formed of spring wire, one medial portion of which is shaped to have an anchor loop 20 that extends laterally through a slot 21 into the pole section, and a pin 22 is lodged in the pole structure so as to extend through the loop 20, thus to limit outward movement of the cleat relative to the pole.

Another medial portion of the cleat is shaped to provide an outwardly projecting finger grip 23, the terminus of which projects back through an opening 24 in the pole with its extreme end bent to form a catch 25, thus to prevent said terminus from complete withdrawal. The opposite end of the cleat is shaped to have an arm 26 that extends parallel with the axis of the pole and overlies the exterior surface thereof, the free end of the arm terminating with an eye loop 27.

The topmost section 9 of the pole has secured upon its medial portion, line guides 28, each of which has a coil 29 with an overlapping terminal so formed as to permit insertion of the line 18 into the opening of the coil or its removal therefrom. The tip end of the pole section 9 has secured thereon another line guide 30 preferably formed of wire, the outer end of which has a coil 31 with an overlapping terminus by which is permitted ready insertion of the line 18 into the opening of the coil or its removal therefrom.

The fish line 18 has attached to its free end a hook 32, and upon the line above the hook is preferably secured a lure, such as an ordinary spinner 33, and on the line above the spinner is secured a sinker 34. There is adjustably disposed on the line 18 a fish bobber 35 at a point thereon above the sinker that is preferably provided with guides 36 adjacent its ends through which the line extends and has free running movement therein, and on the line above the bobber is adjustably secured a stop 37 of any suitable type. Preferably, the stop consists of a small band of rubber looped snugly around the line so as to be adjustable thereon and have contact with the uppermost of the guides 36, thus to limit downdraft of the line with respect to the bobber. Also, the bobber or float has on one side thereof between its line guides 36 a disk 38 around which the line is wound to secure the bobber in adjusted positions thereon when so desired.

Operation

In using the invention the cleats are moved to their outermost positions and one end of the line 18 is tied to one or around both of the cleats. The fasteners 11 and 11' are then adjusted out of engaging position as shown in Fig. 6 to permit insertion of the line 18 into the openings of the guides 12 after which the fasteners are returned to engaging position as shown in Fig. 5, whereupon the terminals of the loops forming the guides contact with each other thus confining the line within the guide openings. The line is then drawn into the coils 29 of the line guides 28 and 31. The free end of the line is equipped with a hook, spinner, sinker, bobber and stop, the arrangement being such that the bobber has free running movement on the line between the sinker and the stop. The line is then coiled around the extended cleats to such extent that the free end portion of the line is of the desired length for fishing operations. As the bobber has limited free movement on the line when the line is not attached to the disk 38, the bobber automatically moves down to the sinker thus augmenting the swing of the baited end of the line when casting. After the bait has alighted in the water the line is drawn down through the bobber guides by the action of the sinker while the bobber is afloat, and the stop 37 limits the downdraft of the line by contact with the uppermost guide on the bobber.

An advantage of the invention is that the line is readily removable from the line guides so that it can be wound up completely around the cleats without disarrangement of the hook, spinner, sinker, bobber or the stop, thus permitting dismemberment of the jointed pole without entanglement of the line or the tackle equipment thereon.

Variations from the particular construction above disclosed may be resorted to by the exercise of skill in the art, without departure from the spirit or scope of the invention, and the following claims are intended to be inclusive of such variations.

What I claim is:

1. In fishing apparatus of the pole and line type, a pole having separable abutting sections provided with encompassing ferrules for the abutting ends of said sections, and a fastener secured in connection with each ferrule and end portion of one corresponding section, each fastener being of spring metal and having a loop formed in a medial portion thereof to provide a line guide and terminating with a bent portion constituting a latch that extends through an opening in the ferrule into the end portion of the other abutting pole section, wherefore to secure said sections together, said loop having opposing shoulders at the terminals thereof that have contact with each other when the latch is in engaging position to confine a line within the guide opening, and which are held spaced apart to permit insertion into or withdrawal from the guide opening of a medial portion of said line when the latch is withdrawn from its normal engaging position and sprung laterally thus to open said loop.

2. A spring wire fastener for abutting sections of a jointed pole, one end of said fastener being secured to one of said sections and its opposite end having latching engagement with the other section thus to secure said sections together, a midportion of said fastener having formed therein a normally open loop that becomes closed upon springing of the fastener into latching position thus forming a line guide.

EDWARD H. KRUSE.